United States Patent [19]

Akimoto et al.

[11] 4,158,600

[45] Jun. 19, 1979

[54] APPARATUS FOR HANDLING CONTROL ROD DRIVES

[75] Inventors: Seiichi Akimoto; Mitsuhiro Watanabe; Tomiharu Yoshida, all of Hitachi; Zunichi Sugaya, Katsuta; Takashi Saito; Yoshimi Ishii, both of Hitachi, all of Japan

[73] Assignee: Hitachi, Ltd., Japan

[21] Appl. No.: 778,168

[22] Filed: Mar. 16, 1977

[30] Foreign Application Priority Data

Mar. 19, 1976 [JP] Japan .................. 51-29106

[51] Int. Cl.² .............................. G21C 19/20
[52] U.S. Cl. .................... 176/30; 176/36 R; 176/36 C
[58] Field of Search .............. 176/30, 36; 29/427, 29/723 X, 726

[56] References Cited

U.S. PATENT DOCUMENTS

| 3,079,323 | 2/1963 | Hawke | 176/36 R |
|---|---|---|---|
| 3,186,915 | 6/1965 | Danieli et al. | 176/36 R |
| 3,527,670 | 9/1970 | Winders | 176/36 R |
| 3,583,892 | 6/1971 | Isaac | 176/30 |
| 3,604,746 | 9/1971 | Notari | 176/36 R |
| 3,607,629 | 9/1971 | Frisch et al. | 176/36 R |
| 3,715,269 | 2/1973 | Mehren | 176/36 R |
| 3,836,429 | 9/1974 | Frisch et al. | 176/30 |
| 3,836,430 | 9/1974 | Frisch et al. | 176/30 |
| 4,053,355 | 10/1977 | Vuckovich | 176/36 C |

FOREIGN PATENT DOCUMENTS 5146695 4/1976 Japan .................. 176/36 R

Primary Examiner—Samuel W. Engle
Assistant Examiner—S. A. Cangialosi
Attorney, Agent, or Firm—Craig and Antonelli

[57] ABSTRACT

Apparatus for handling control rod drives (CRD's) attached by detachable fixing means to housings mounted in a reactor pressure vessel and each coupled to one of control rods inserted in the reactor pressure vessel. The apparatus for handling the CRD's comprise cylindrical housing means, uncoupling means mounted in the housing means for uncoupling each of the control rods from the respective CRD, means mounted on the housing means for effecting attaching and detaching of the fixing means, means for supporting the housing means, and means for moving the support means longitudinally of the CRD.

39 Claims, 9 Drawing Figures

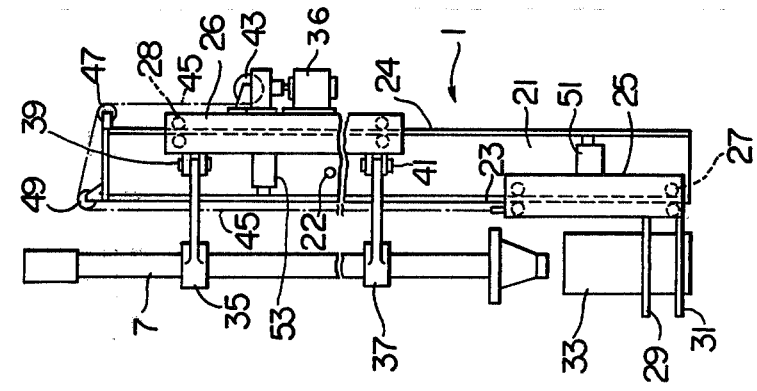
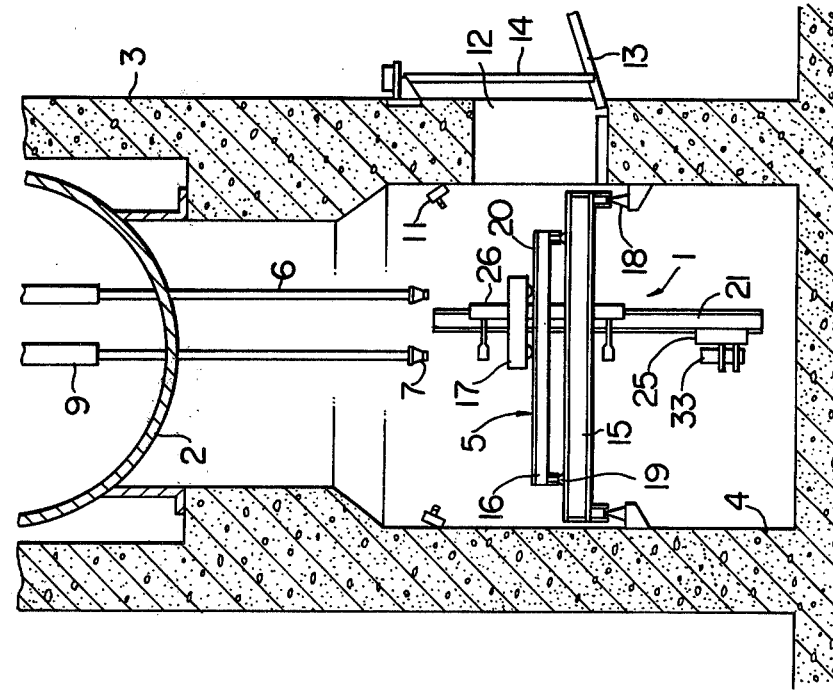

F I G. 7
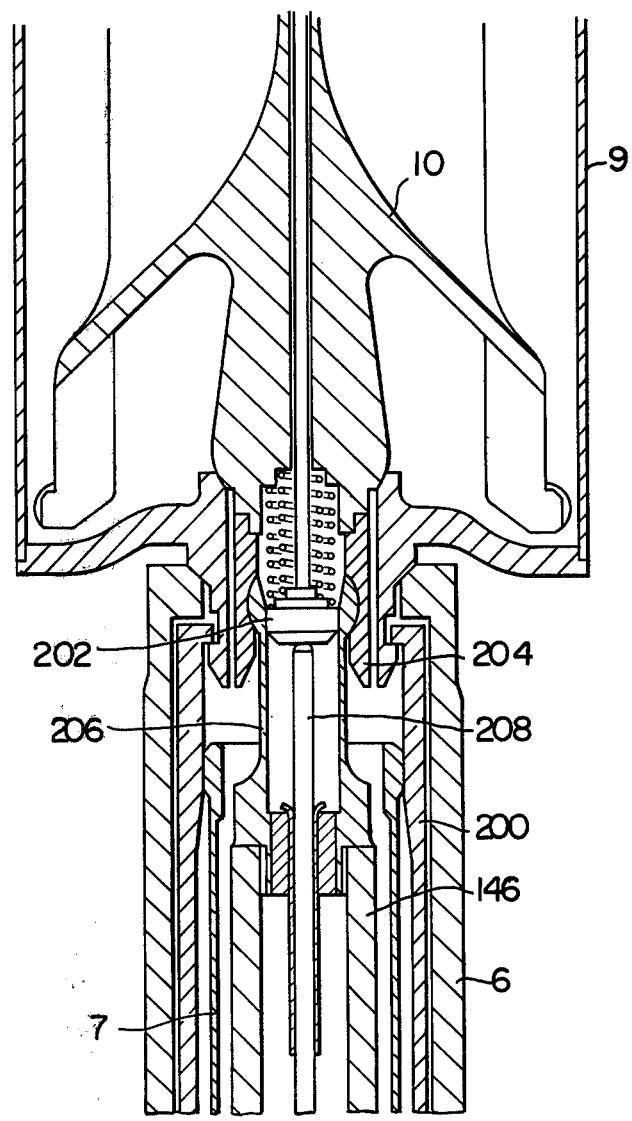

APPARATUS FOR HANDLING CONTROL ROD DRIVES

BACKGROUND OF THE INVENTION

This invention relates to apparatus for handling control rod drives, and more particularly it deals with apparatus for handling control drives which facilitates removal of control rod drives from a reactor pressure vessel and mounting of the same therein.

Heretofore, in a boiling-water reactor, great difficulty has been encountered in effecting maintenance and inspection of control rod drives (CRD's) mounted in a manner to be located below a reactor pressure vessel. That is, in carrying out this operation, the CRD's must be removed from the reactor pressure vessel by performing an operation in a region of high radiation level. It has hitherto been common practice to perform this operation manually by operators who put on protective clothing. It takes a lot of labor and time to perform this operation. Moreover, there is the hazard of the operators being exposed to a high level of radiation. Thus, there has been an increased demand for the development of apparatus permitting maintenance and inspection of each CRD to be carried out automatically without requiring manual attention.

SUMMARY OF THE INVENTION

Accordingly, this invention has as its object the provision of apparatus for handling CRD's which eliminates the disadvantages of the prior art and enables maintenance and inspection of each CRD to be effected readily and positively.

According to the invention, there is provided apparatus for handling CRD's attached by detachable fixing means to housings mounted in a reactor pressure vessel and each coupled to one of control rods inserted in the reactor pressure vessel, such apparatus comprising cylindrical housing means, uncoupling means arranged in the housing means for uncoupling each of the control rods from the respective CRD, means mounted on the housing means for effecting attaching and detaching of the fixing means, and means for moving the support means longitudinally of the CRD.

In a preferred embodiment of this invention, the uncoupling means of the apparatus for handling each CRD further comprises means for detachably connecting the uncoupling means to the CRD. In this embodiment, the housing means is rotatably supported on the support means, and the support means is provided with means for driving the support means and causing same to rotate. This embodiment further comprises means for preventing release to outside of coolant from the CRD housing when the fixing means is detached, and drain means for leading the coolant flowing out of the CRD housings to a predetermined position for disposal.

BRIEF DESCRIPTION OF THE DRAWINGS

FIG. 1 is a schematic view of the apparatus for handling CRD's comprising one embodiment of the invention and mounted on the carriage device beneath a nuclear reactor pressure vessel;

FIG. 2 is a schematic view showing the apparatus for handling CRD's of FIG. 1 in its entirety;

FIG. 7 is a vertical sectional view showing the connection between the lower end of a control rod and the upper end of a CRD;

DESCRIPTION OF THE PREFERRED EMBODIMENT

Figure 3:
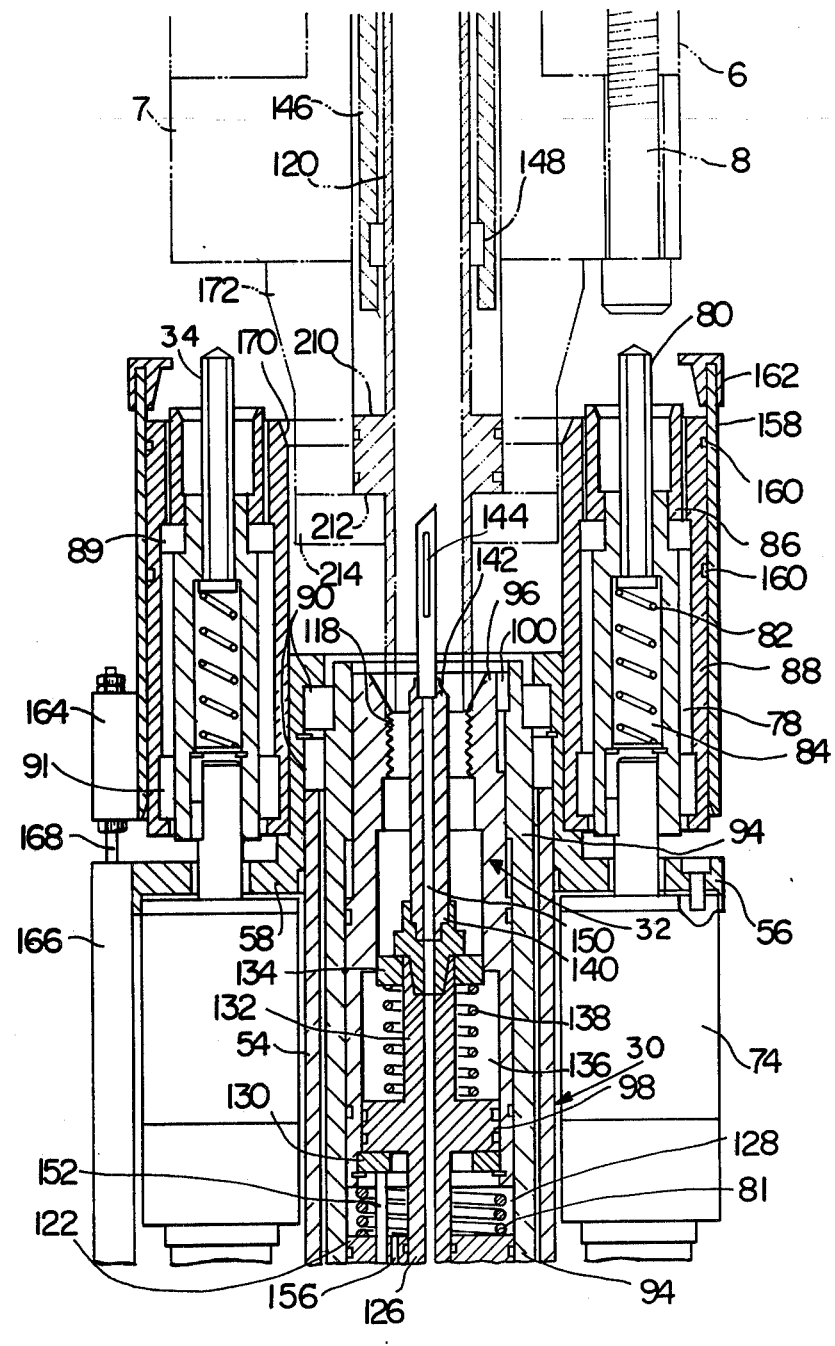
FIG. 3 is a vertical sectional view of an upper half of the CRD attaching and detaching device of the apparatus for handling CRD's.

A preferred embodiment of the present invention will now be described with reference to the accompanying drawings. Referring to FIG. 1, there is shown the apparatus for handling control rod drives (hereinafter referred to as CRD's) generally designated by the reference numeral 1. The CRD handling apparatus 1 is mounted on a carriage device 5 arranged in a reactor lower chamber 4 defined in a pedestal 3 for supporting a reactor pressure vessel 2. A plurality of CRD housings 6 extend vertically through the reactor pressure vessel 2 and each contain therein a CRD 7. Each CRD housing 6 is detachably attached by bolts 8 at its lower end to each CRD 7 at its lower end (See FIGS. 3, 8 and 9). A plurality of control rod guide tubes 9 extend downwardly from a reactor core in the reactor pressure vessel 2 and each contain therein a control rod 10 which is movable vertically (See FIG. 7). As shown in FIG. 7, each guide tube 9 is secured at its lower end to an upper end of each CRD housing 6, and the control rod 10 is detachably connected at its lower end to an upper end of a CRD. The numeral 11 designates television cameras for watching the operation. The numerals 12, 13 and 14 designate an opening through which access can be had to the interior of the chamber 4, a bridge and a winch for operating the bridge 13, respectively.

The carriage device 5 comprises an operation carriage 15 and movable carriages 16, 17. The operation carriage 15 is rotatably supported on an annular guide rail 18 attached to an inner wall surface of the reactor lower chamber 4 and has attached on its upper surface a pair of rectilinear guide rails 19 on which the movable carriage 16 is mounted. The movable carriage 16 has mounted on its upper surface a pair of rectilinear guide rails 20 oriented in a direction at a right angle to the guide rails 19 for supporting thereon the movable carriage 17. The operation carriage 15 and movable carriages 16, 17 are driven for movement by suitable means (not shown) in a manner to be able to stop and be fixed in place in desired positions. By using the carriage device 5 constructed as aforementioned, it is possible to accurately and quickly effect positioning of the CRD handling apparatus 1 with respect to each CRD 7.

The CRD handling apparatus 1 is shown in an outline in FIG. 2. The CRD handling apparatus 1 includes a column 21 which is in the form of a letter H in cross-section and supported by a support shaft 22 mounted on the movable carriage 17, through pneumatic cylinder means (not shown), for example, for pivotal movement about the support shaft 22. Carriages 25 and 26 in the form of a letter U in cross-section are mounted on opposing flanges 23 and 24 of the column 21 and supported on rollers 27, 28 for movement along the flanges 23 and 24 respectively. The carriage 25 has fixed thereto a pair of support arms 29 and 31 for supporting a CRD attaching and detaching device 33 as subsequently to be described. A pair of gripping members 35 and 37 for gripping a CRD 7 to be handled are pivotally supported through pins 39 and 41 respectively by the other carriage 26. The gripping members 35 and 37 each consist of a pair of arms pivotally movable toward and away from each other by pneumatic cylinder means (not shown) for gripping the CRD 7. The carriage 25 has attached thereto a winding drum 43 from which a rope 45 extends along the outer periphery of the column 21, through rollers 47, 49 mounted at the top of the column 21, to be connected at its forward end to the carriage 25. A motor 36 for driving the winding drum 43 is arranged on the carriage 26. Brakes 51 and 53 of the air cylinder type are mounted on the carriages 25 and 26 respectively. If the motor 36 is actuated when only the brake 53 is applied, then the carriage 25 is pulled by the rope 45 and moves upwardly along the column 21.

Figure 4:
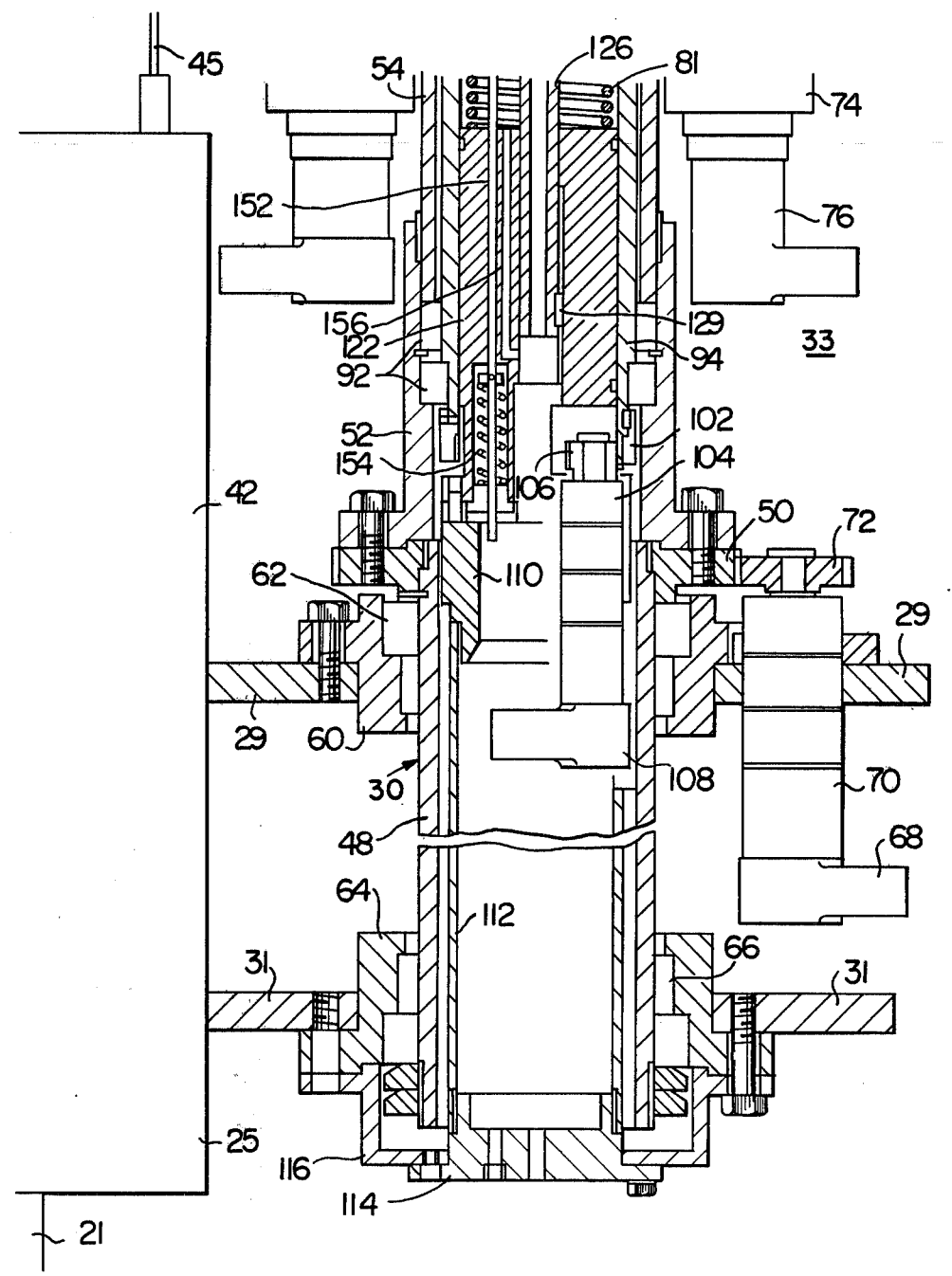
FIG. 4 is a vertical sectional view of a lower half of the CRD attaching and detaching device.

The construction of the CRD attaching and detaching device 33 will now be described with reference to FIGS. 3 and 4. FIG. 3 shows an upper half of the device 33, while FIG. 4 shows a lower half thereof. The device 33 comprises cylindrical housing means 30 supported by the support arms 29 and 31 and mounting therein uncoupling means 32 for disconnecting the control rod 10 from the associated CRD 7. Connecting bolt handling means 34 for attaching and detaching bolts 8 which couple the CRD housing 6 to the respective CRD 7 is mounted over the housing means 30.

The housing means 30 includes a cylindrical support post 48 which has a cylinder 52 bolted in place at its upper end through a gear 50. Mounted at an upper end portion of the cylinder 52 is a tube 54 which has fixed at its upper end a sleeve 58 formed with a flange 56. An upper portion of the support post 48 is rotatably supported by a bearing 62 housed in a sleeve 60, while a lower portion thereof is rotatably supported by a bearing 66 housed in a sleeve 64. The sleeves 60 and 64 are bolted to the support arms 29 and 31 respectively.

The upper support arm 29 has mounted thereon an air motor 68 and a reduction means 70, the latter having an output shaft having secured thereto a pinion 72 which is maintained in meshing engagement with gear 50. Thus, when the pinion 72 is actuated by means of the air motor 68, gear 50 is rotated to thereby rotate the housing means 30 as a unit.

The connecting bolt handling means 34 includes a plurality of reduction means 74 bolted to the flange 56 of the sleeve 58 and a plurality of air motors 76 connected to the reduction means 74. The reduction means 74 and air motors 76 are of the same number as the bolts 8, so that eight sets of reduction means and air motors are mounted around the tube 54 and spaced substantially equidistantly from one another. The reduction means 74 each have an output shaft to which is connected a hollow shaft 78 receiving in the center opening of the shaft 78 a bolt wrench 80 for rotation with the shaft 78 as a unit, to provide a bolt wrench assembly. A chamber 84 mounting a spring 82 therein is formed in the hollow shaft 78 beneath the bolt wrench 80 so that the spring 82 urges the bolt wrench 80 to move upwardly at all times. The presence of the spring 82 and chamber 84 lessens the impact applied to the bolt wrench 80 when the bolt 8 is pressed against the upper end of the bolt wrench so as to ensure that the bolt wrench 80 moves satisfactorily in a downward stroke. Each shaft 78 has secured to its forward end a bolt holder 86 which holds a head of the bolt 8 which has been removed from the CRD housing 6. The shafts 78 and bolt holders 86 are rotatably supported by bearings 89 and 91 in a bolt house 88 fixed on the sleeve 58.

Each bolt wrench 80 is required to produce a torque of revolution of a high magnitude for attaching or detaching the respective bolt 8. To meet this requirement, the high speed rotation of each air motor 76 is reduced at a high reduction ratio by the respective reducing means 74 so as to obtain a high output torque from the air motors 76.

The uncoupling means 32 is arranged in the tube 54 and includes a cylinder tube 94 which has its upper portion rotatably supported by bearings 90 mounted on the sleeve 58 and its lower portion rotatably supported by bearings 92 mounted in the cylinder 52. Inserted in the cylinder tube 94 is a screw cylinder 96 in which a piston 98 is fitted. The screw cylinder 96 is keyed at 100 to the cylinder tube 94, so that the screw cylinder 96 is rotatable with the cylinder tube 94 as a unit and reciprocable relative thereto. Mounted in a lower portion of the cylinder tube 94 is an internal gear 102 which is maintained in meshing engagement with a pinion 106 mounted on an output shaft of a reduction means 104 which is connected to an air motor 108 and fixedly supported by a support 110. The support 110 is fixedly supported by a guide tube 112 arranged in the support post 48 and fixed to the lower support arm 31 through support members 114, 116 and the sleeve 64. The screw cylinder 96 is formed on the inner surface of its head with an internally threaded portion 118 which is adapted to be brought into engagement with an externally threaded portion formed in a lower portion of a piston tube 120 of each CRD 7 to thereby connect the attaching and detaching device 33 to each CRD 7.

A guide rod 122 is mounted beneath the screw cylinder 96 in the cylinder tube 94 for sliding movement along an inner wall surface of the cylinder tube 94. The guide rod 122 is fixedly supported by a support member 110. A spring 81 is mounted between a lower end of the screw cylinder 96 and an upper surface of the guide rod 122 in the cylinder tube 94. When the screw cylinder 96 is disposed in its uppermost position (See FIG. 9), it is free from the influence of spring 81. However, when the screw cylinder 96 has moved to its lower position by its own weight, it is subjected to the biasing force of spring 81, so that spring 81 performs the function of absorbing shock when the screw cylinder 96 is brought into contact with the piston tube 120 of each CRD 7.

The piston 98 mounted in the screw cylinder 96 has connected thereto a piston rod 126 which extends downwardly therefrom and is keyed at 129 to the guide rod 122. This permits the piston 98 to move only vertically relative to the guide rod 122. The underside of the piston 98, upper surface of the guide rod 122 and inner wall surface of the cylinder tube 94 define a lower cylinder chamber 128 disposed below the piston 98 and mounting spring 81 therein. A ring 130 is attached to a lower portion of the screw cylinder 96 to prevent downward movement of the piston 98. The piston 98 has attached thereto an upwardly extending piston rod 132 which mounts thereon a ring 134 capable of moving in reciprocatory movement therealong. The ring 134 is capable of moving in reciprocatory movement in the screw cylinder 96 too. Defined by the inner wall surface of the screw cylinder 96, upper surface of the piston 98 and the ring 134 is an upper cylinder chamber 136 disposed over the piston 98 and mounting therein a spring 138 in a manner to surround the piston rod 132. A stopper 140 for keeping the ring 134 in place is affixed to the forward end of the piston rod 132 so that an upwardly directed biasing force is exerted on the ring 134 at all times. A tube 142 is mounted on the stopper 140 and has attached to its forward end a reed switch 144 which is adapted to be actuated by a magnet 148 mounted on a lower end of an index tube 146 surrounding the piston tube 120 of each CRD 7. A passage 150 extending vertically along the axes of tube 142, stopper 140, piston 98 and piston rods 126, 132 is provided and has mounted therein wires (not shown) for the reed switch 144.

A rod 152 extends through the guide rod 122 and slidable therealong. The rod 152 is attached at its upper end to ring 130 and supported at its lower end by a spring 154 mounted in the guide rod 122 so that rod 152 can act as a screwing stroke detector. A pressurized fluid supply passage 156 extends through the guide rod 122 and opens at one end thereof in the lower cylinder chamber 128 and is connected at the other end to a suitable pressurized fluid source (not shown).

Mounted at an outer periphery of the bolt house 88 is a cylindrical drain sleeve 158 for vertical sliding motion relative thereto. Packings 160 are provided between the bolt house 88 and drain sleeve 158 for providing a seal therebetween. A packing 162 is mounted at an upper end of the drain sleeve 158. When the drain sleeve 158 moves upwardly along the bolt house 88, an inner end of the packing 162 moves upwardly along outer peripheries of the CRD 7 and CRD housing 6 to provide a liquid-tight seal to the interior of the drain sleeve 158. Two brackets 164 located in diametrically opposed positions on a lower portion of an outer wall surface of the drain sleeve 158 each have affixed thereto an end portion of a piston rod 168 of an air cylinder 166 secured to the flange 56 of the sleeve 58. By this arrangement, the drain sleeve 158 can be moved upwardly along the bolt house 88 when necessary.

The bolt house 88 is formed at an upper end portion of its inner wall with a tapering portion 170 for coming into contact with a forward end portion of each CRD 7 and bearing its weight when the CRD attaching and detaching device 33 is actuated.

Figure 5:
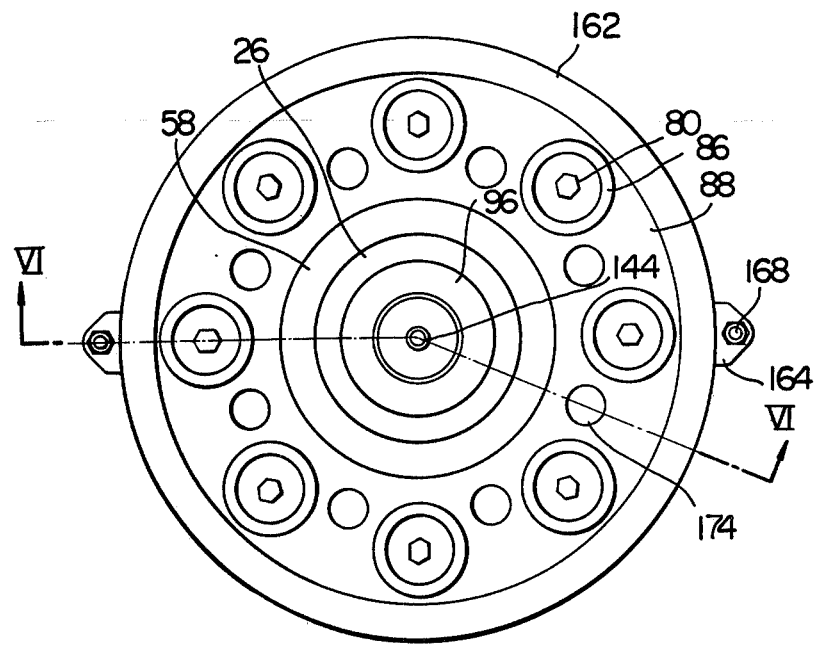
FIG. 5 is a top plan view of the CRD attaching and detaching device shown in FIGS. 3 and 4.
Figure 6:
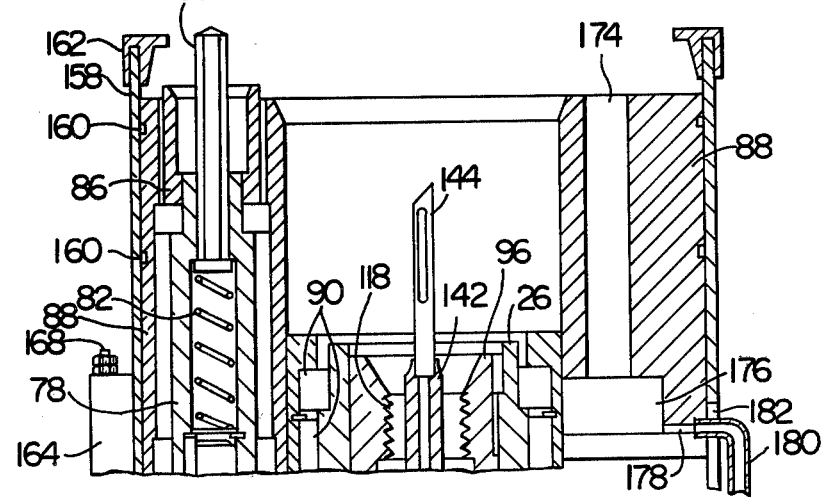
FIG. 6 is a sectional view taken along the line VI—VI of FIG. 5, particularly showing the drain means of the CRD attaching and detaching device.

As shown in FIGS. 5 and 6, the bolt house 88 is formed with drain holes 174 each disposed between the bolt wrench assemblies. The drain holes 174 are each connected to a drain tube 180 through a chamber 176 and a passage 178 formed in the bolt house 88, the drain tube 180 being connected to the passage 178 and extending downwardly therefrom for a distance of about 4 meters. By this arrangement, the coolant flowing out from the CRD 7 during a CRD attaching and detaching operation can be discharged to the bottom of the reactor lower chamber 4. The drain sleeve 158 is formed with slits 182 to avoid the interfering of the drain tubes 180 with the vertical movement of the drain sleeve 158.

To enable the operation of the CRD attaching and detaching device 33 constructed as aforesaid to be better understood, means for coupling each control rod 10 inserted in the reactor core to one of the CRD's 7 will be described in detail, before describing the operation of the device 33. Referring to FIG. 7, the CRD housing 6 is mounted at its upper end to a lower end of the guide tube 9 for vertically guiding the control rod 10. A thermal sleeve 200 is fitted in the CRD housing 6, and a plug 202 is inserted in the control rod 10 and located along the center axis thereof. A socket 204 is attached to a lower end of the control rod 10. A spud 206 is mounted at an upper end of an index tube 146 fitted in and extending axially of the CRD 7. If the spud 206 is inserted in the socket 204 and the plug 202 is inserted in the spud 206 so that the spud 206 may be forced tightly against the socket 204, then the control rod 10 is connected to the CRD 7. A piston tube 120 fitted in the index tube 146 (See FIG. 8) has secured to its upper end an uncoupling rod 208 which is engageable with the plug 202. Thus, by moving the piston tube 120 upwardly, it is possible to cause the uncoupling rod 208 to push the plug 202 upwardly.

The operation of the CRD handling apparatus 1 will be described by referring to FIGS. 3, 4, 8 and 9 as applied to an operation of maintaining and inspecting the CRD's 7.

First, in order to bring the CRD attaching and detaching device 33 to a position in which it is in alignment with the CRD 7 to be handled, the CRD handling apparatus 1 is bodily moved by the carriage device 5 in the reactor lower chamber 4. The positioning of the device 33 can be effected quickly and accurately by the rotary movement of the operating carriage 15 and the linear movements of the movable carriages 16 and 17. Upon completion of the positioning, motor 36 is actuated to move the CRD attaching and detaching device 33 upwardly along the column 21. This upward movement is stopped immediately before the upper ends of the bolt wrenches 80 are brought into contact with the lower ends of the bolts 8. While the device 33 is in this position, the carriage device 5 is operated again, if necessary, to ensure that the CRD attaching and detaching device 33 is accurately in alignment with the CRD 7. At this time, the relative positions of the CRD attaching and detaching device 33 and the CRD 7 are substantially as shown in FIG. 3. It will be seen that the lower end of the piston tube 120 of the CRD 7 has just come into contact with the screw cylinder 96 of the CRD attaching and detaching device 33.

Figure 8:
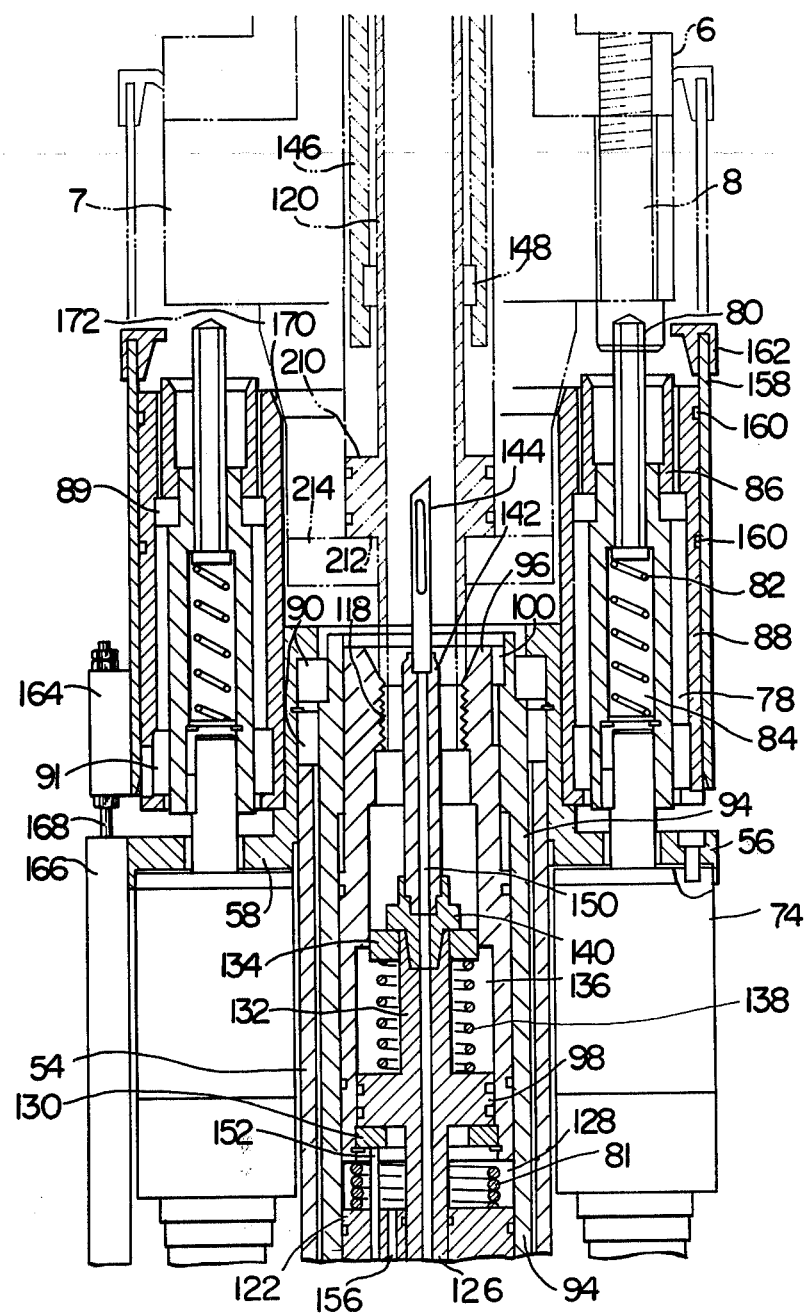
FIG. 8 is a view similar to FIG. 3 but showing the CRD attaching and detaching device with the screw cylinder thereof being in threadable engagement with the piston tube of a CRD.

Then, air motor 68 is actuated to rotate the housing means 30 so as to thereby bring the bolt wrenches 80 of the connecting bolt handling means 34 to positions in which they are in alignment with the respective bolts 8. Rotation of the air motor 68 is transmitted through the reduction means 70, pinion, 72 and gear 50 to the support post 48 and cylinder 52. Rotation of the cylinder 52 causes the tube 54 and sleeve 58 to rotate, to thereby rotate the connecting bolt handling means 34. After positioning of the bolt wrenches 80 is completed, motor 36 is actuated again to move the CRD attaching and detaching device 33 further upwardly. Usually, hexagonal openings of the heads of the bolts 8 and the bolt wrenches 80 are angularly displaced from one another, so that coupling of the device 33 to the CRD 7 cannot be readily accomplished. Therefore, with the upward movement of the device 33, the bolt wrenches 80 are pressed by the bolts 8 after coming in touch with the heads thereof, with a result that each bolt wrench 80 moves downwardly through a chamber 84 for the shaft 78 against the biasing force of spring 82. The upward movement of the CRD attaching and detaching device 33 is stopped in a position in which each bolt wrench 80 would be in engagement with the respective bolt 8 over a sufficiently large distance to ensure coupling between the drive 33 and the CRD 7 if each bolt wrench 80 were received in the hexagonal opening in the head of the respective bolt 8. Usually, this position is preferably a position in which the tapering portion 170 of the bolt house 88 is positioned against the forward end portion of the CRD 7 as shown in FIG. 8. Also, as the device 33 is moved upwardly, the screw cylinder 96 is pressed by the piston tube 120 and moves downwardly a suitable distance in the cylinder tube 94 against the biasing force of spring 81. Thus, the screw tube 96 is in a position relative to the piston tube 120 such that if the tube 96 is rotated then the connecting threaded portion 118 can be threadably connected to the threaded portion of the piston tube 120.

Air motor 108 is actuated to connect the CRD attaching and detaching device 33 to the CRD 7. Rotation of air motor 108 is transmitted through the reduction means 104, pinion 106, internal gear 102 and cylinder tube 94 to the screw cylinder 96. As the screw cylinder 96 rotates, the connecting threaded portion 118 is brought into threadable engagement with the threaded portion of the piston tube 120, thereby allowing the screw cylinder 96 to move upwardly. When the threadable connection has reached a length of about 20 millimeters, air motor 108 is de-actuated. This threadable connection length is detected by the screwing stroke detector 152. At this time, the CRD attaching and detaching device 33 is in a state shown in FIG. 8 which also shows the relative positions of the device 33 and the CRD 7, in which the spacing between the upper surface of the screw cylinder 96 and the underside of the CRD 7 is about 25 millimeters. It should be noted that in FIG. 8 the bolt wrenches 80 are shown as being in engagement with the hexagonal openings at the heads of the respective bolts 8.

Upon completion of coupling of the CRD 7 to the CRD attaching and detaching device 33, an operation of uncoupling the control rod 10 from the CRD 7 is initiated. First, pressurized air is supplied from the pressurized fluid supply source (not shown) to the lower cylinder chamber 128 through passage 156. This causes the screw cylinder 96 to move upwardly along the inner wall surface of the cylinder tube 94, with a result that the piston 98 also moves upwardly along the inner wall surface of the screw cylinder 96. Upward movement of the screw cylinder 96 moves the piston tube 120 of the CRD 7 upwardly. Upward movement of the piston 98 also places the reed switch 144 in an extended position in which uncoupling of the control rod 10 from the CRD 7 can be ascertained.

Upward movement of the piston tube 120 causes the uncoupling rod 208, which is unitary with the piston tube 120, to move the plug 202 upwardly, thereby releasing the plug 202 from engagement with the spud 206. Then, hydraulic pressure is supplied to the CRD 7 to move the index tube 146 downwardly. When the index tube 146 has moved to a position in which its forward end is positioned against an enlarged shoulder 210 of the piston tube 120 (See FIG. 9), uncoupling of the control rod 10 from the CRD 7 is completed. When the index tube 146 is in this position, the magnet 148 is substantially flush with the reed switch 144 which is in its extended position. Thus, the reed switch 144 is energized by the magnet 148 and turned on, so that it is possible to ascertain from outside that the control rod 10 has been uncoupled from the CRD 7. By using a signal generated by the reed switch 144 as an interlock signal for sequentially performing the subsequent operation steps of the CRD handling apparatus 1, it is possible to increase the safety of operation.

Thereafter, the pressurized air in the lower cylinder chamber 128 is released therefrom to move the screw cylinder 96 downwardly. Downward movement of the screw cylinder 96 results in downward movement of the piston tube 120 and the index tube 146 whose forward end is positioned against the enlarged shoulder 210 of the piston tube 120. This downward movement of the piston tube 120 stops when an enlarged lower shoulder 212 thereof is positioned against a flange 214 at a lower end of the CRD 7. In this way, the control rod 10 is completely uncoupled from the CRD 7.

For the sake of preventing scattering of the coolant, pressurized air is supplied to air cylinders 166 to move piston rods 168 outwardly therefrom to cause the drain sleeve 158 to move upwardly along the outer peripheries of the bolt house 88 and CRD 7. The drain sleeve 158 moved to its upper position in this way is shown in dash-and-dot lines in FIGS. 8 and 9.

Figure 9:
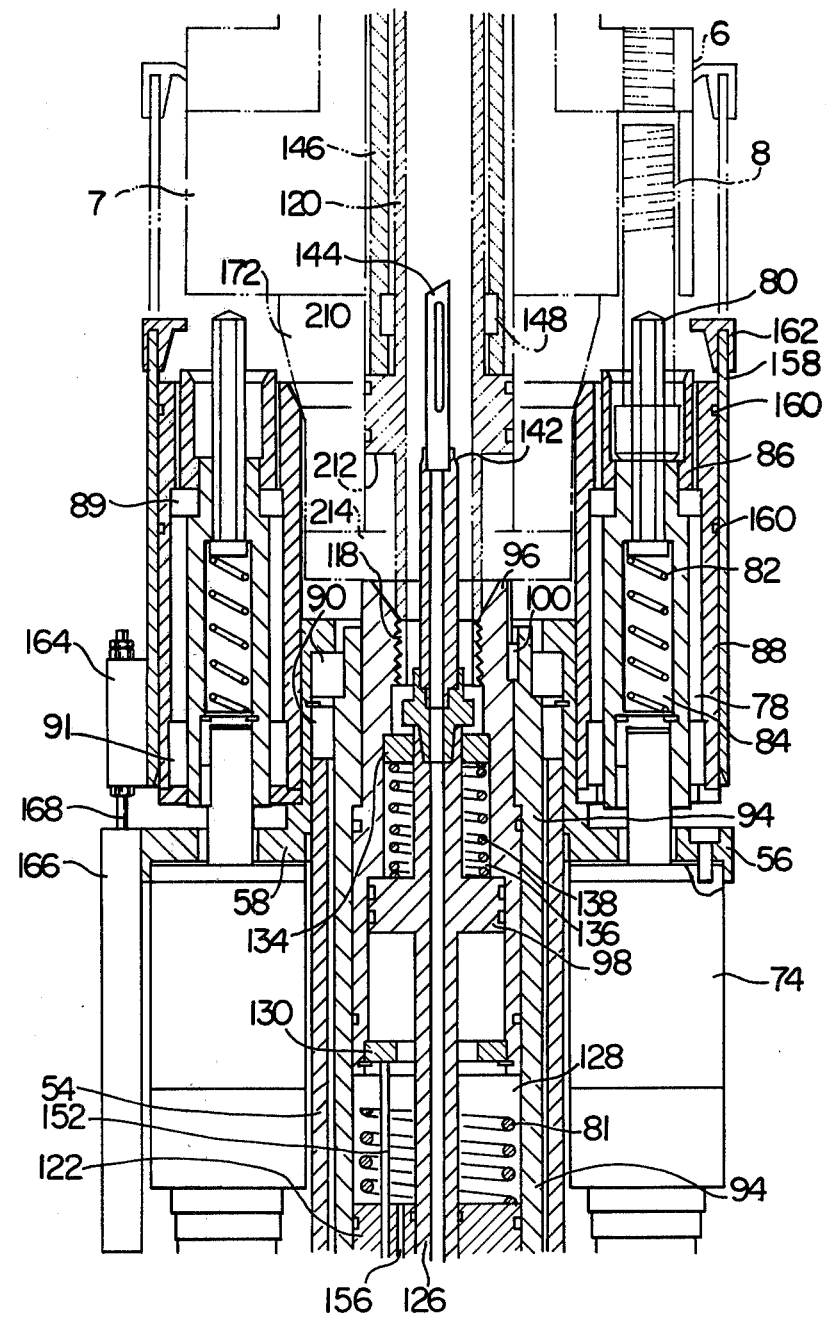
FIG. 9 is a view similar to FIG. 3 but showing the CRD attaching and detaching device with a control rod being uncoupled from the associated CRD.

Air motors 76 are actuated to detach the connecting bolts 8. Rotation of air motors 76 is transmitted through reduction means 74 and shafts 78 to the bolt wrenches 80 which are rotated thereby. The bolt wrenches 80 are first rotated through a small angle to complete the engagement of the bolt wrenches 80 with the respective bolts 8 in case the engagement of the bolt wrenches 80 in the hexagonal openings in the heads of the bolts 8 is not completed. This operation may be performed prior to uncoupling of the control rod 10 from the associated CRD 7. After confirming that the bolt wrenches 80 are in complete engagement in the hexagonal openings in the heads of the bolts 8, air motors 76 are actuated again to remove the bolts 8. This operation is preferably performed simultaneously with all the bolts 8. The bolts 8 removed from the CRD housing 6 are retained in the bolt holders 86. After the bolts 8 have been removed, the bolt wrenches 80 move downwardly into chambers 84. FIG. 9 shows the CRD attaching and detaching device 33 in this state and the relative positions of the device 33 and the CRD 7 at this time.

Upon completion of the bolt detaching operation, carriage 25 is moved downwardly a distance of about 10 millimeters. The CRD 7 also moves downwardly the same distance. This causes the coolant accumulated in the CRD housing 6 to be discharged therefrom. The coolant is led into a space formed in the drain sleeve 158, from which it is discharged through the drain holes 174, drain chambers 176, and drain passages 178 in the drain sleeve 158 into the drain tubes 180. From the drain tubes, the coolant is released to a predetermined position in the reactor lower chamber 4 (See FIGS. 5 and 6). The provision of packing 162 at the upper end edge of the drain sleeve 158 obviates an accident of the coolant overflowing the drain sleeve 158. Thus, disposal of the coolant of high radiation level can be performed safely without permitting same to leak to outside.

After confirming that the release of the coolant from the CRD housing 6 has been completed, carriage 25 is moved further downwardly, so that the CRD 7 can be withdrawn completely from the CRD housing 6. Following the complete withdrawal of the CRD 7, it is gripped by the gripping members 35 and 37 as shown in FIG. 2 and disconnected from the CRD attaching and detaching device 33. Then, the column 21 is moved pivotally about the support shaft 22 by the fluid cylinder means (not shown), so that the CRD 7 is brought to a substantially horizontal position. The CRD 7 is moved by known means through the opening 12 formed in the pedestal 3 into the bridge 13 from which it is transported to a predetermined destination. The aforesaid operation is performed under surveilance by the television cameras 11.

In performing the operation of coupling a CRD 7 to a CRD housing 6 after inspection is finished, the aforementioned sequence of operations are performed by reversing the order. In this case, it is not necessary to move the drain sleeve 158 upwardly.

In the aforementioned series of operations, a CRD 7 is positively coupled to the CRD attaching and detaching device 33 by bringing the internal threaded portion 118 formed in the screw cylinder 96 into engagement with the external threaded portion formed in the piston tube 120. However, it is to be understood that this threadable connection is not essential and can be eliminated, if desired. If this is the case, uncoupling of the CRD 7 from the control rod 10 and removal of the bolts 8 from the CRD housing 6 result in the CRD 7 moving downwardly by gravity when carriage 25 is moved downwardly, so that the CRD 7 can be withdrawn. However, prolonged use of a CRD 7 sometimes interferes with downward movement thereof by its own weight. By taking this trouble into consideration, it is desirable that the CRD 7 be positively coupled to the CRD attaching and detaching device 33 by a threadable connection between the internal threaded portion 118 and the external threaded portion of the piston tube 120 so that the CRD can be forcibly withdrawn.

We claim:

1. Apparatus for handling control rod drives (hereinafter referred to as CRD's), each CRD being received in an elongated housing mounted to a reactor pressure vessel so as to extend vertically into and out of the reactor vessel and being provided with a piston tube, each CRD having an upper end portion connected with a lower end of a control rod and a lower end portion connected with a lower end of the elongated housing by detachable fixing means, and a plug-socket means for connecting the upper end portion of the CRD with the lower end of the control rod so that the CRD may be uncoupled from the control rod when the piston tube is longitudinally moved toward the lower end of the control rod, comprising in combination:
   a CRD attaching and detaching means including cylindrical housing means, uncoupling means disposed in said housing means for engaging a lower end portion of said piston tube and for longitudinally moving the piston tube toward the lower end of the control rod to uncouple said CRD from said control rod, and means mounted on said housing means for effecting attaching and detaching of the fixing means, said uncoupling means comprises means for detachably connecting the uncoupling means to said CRD;
   means for supporting said CRD attaching and detaching means; and
   means for moving said supporting means longitudinally of the CRD.

2. Apparatus for handling control rod drives (hereinafter referred to as CRD's), each CRD being received in an elongated housing mounted to a reactor pressure vessel so as to extend vertically into and out of the reactor vessel and being provided with a piston tube, each CRD having an upper end portion connected with a lower end of a control rod and a lower end portion connected with a lower end of the elongated housing by detachable fixing means, and a plug-socket means for connecting the upper end portion of the CRD with the lower end of the control rod so that the CRD may be uncoupled from the control rod when the piston tube is longitudinally moved toward the lower end of the control rod, comprising in combination:
   a CRD attaching and detaching means including cylindrical housing means, uncoupling means disposed in said housing means for engaging a lower end portion of said piston tube and for longitudinally moving the piston tube toward the lower end of the control rod to uncouple said CRD from said control rod, and means mounted on said housing means for effecting attaching and detaching of the fixing means, said uncoupling means comprises means for detachably connecting the uncoupling means to said CRD;
   means for supporting said CRD attaching and detaching means, said housing means is rotatably supported on said supporting means, and said supporting means is provided with means for driving said housing means for rotation; and
   means for moving said supporting means longitudinally of the CRD.

3. Apparatus as claimed in claim 2, wherein said driving means for rotation comprises an air motor and a reduction means.

4. Apparatus for handling control rod drives (hereinafter referred to as CRD's), each CRD being received in an elongated housing mounted to a reactor pressure vessel so as to extend vertically into and out of the reactor vessel and being provided with a piston tube, each CRD having an upper end portion connected with a lower end of a control rod and a lower end portion connected with a lower end of the elongated housing by detachable fixing means, and a plug-socket means for connecting the upper end portion of the CRD with the lower end of the control rod so that the CRD may be uncoupled from the control rod when the piston tube is longitudinally moved toward the lower end of the control rod, comprising in combination:
   a CRD attaching and detaching means including cylindrical housing means, uncoupling means disposed in said housing means for engaging a lower end portion of said piston tube and for longitudinally moving the piston tube toward the lower end of the control rod to uncouple said CRD from said control rod, and means mounted on said housing means for effecting attaching and detaching of the fixing means;
   means for supporting said CRD attaching and detaching means;
   means for moving said supporting means longitudinally of the CRD;
   means for preventing scattering of coolant flowing out of each of said CRD housings when said fixing means is detached; and
   drain means for discharging released coolant to a predetermined position.

5. Apparatus as claimed in claim 4, wherein each of said CRD's is fixed to one of said CRD housings by means of a plurality of bolts, and wherein said means for effecting attaching and detaching of said fixing means comprises bolt wrench assemblies equal in number to said bolts arranged in an outer peripheral portion of said CRD housing, said bolt wrench assemblies being located in an annular bolt house secured to an upper portion of an outer periphery of said housing means.

6. Apparatus as claimed in claim 5, wherein said coolant scattering preventing means comprises a drain sleeve mounted on an outer periphery of said bolt house for upward movement therealong, and driving means mounted on said housing means for moving said drain sleeve, said drain sleeve having a packing mounted at an upper end thereof and adapted to be brought into liquid-tight sealing engagement with outer peripheries of the CRD and CRD housing.

7. Apparatus as claimed in claim 5, wherein said drain means comprises a plurality of drain holes formed in said bolt house, and a plurality of drain tubes connected to said bolt house and each communicating with one of said drain holes.

8. Apparatus for handling control rod drives (hereinafter referred to as CRD's) attached by detachable fixing means to housing mounted in a reactor pressure vessel and each coupled to one of control rods inserted in the reactor pressure vessel, comprising in combination:
   cylindrical housing means;
   uncoupling means mounted in the housing means for uncoupling each of said control rods from one of said CRD's;
   means mounted on the housing means for effecting attaching and detaching of said fixing means;
   means for supporting said housing means;
   means for moving the support means longitudinally of the CRD;
   means for preventing scattering of coolant flowing out of each of said CRD housings when said fixing means is detached;
   drain means for discharging the released coolant to a predetermined position; and
wherein each of said CRD's is fixed to one of said CRD housings by means of a plurality of bolts, and said means for effecting attaching and detaching of said fixing means comprises bolt wrench assemblies equal in number to said bolts.

9. Apparatus as claimed in claim 8, wherein each of said bolt wrench assemblies comprises a bolt wrench engageable with one of said bolts, and means for driving each said bolt wrench for rotation.

10. Apparatus as claimed in claim 9, wherein each said bolt wrench is reciprocatorily fitted in a hollow shaft rotatably supported by said housing means, and resilient means is mounted in said hollow shaft for normally urging the bolt wrench to move upwardly by its biasing force and said shaft is driven for rotation by said driving means 11. Apparatus as claimed in claim 10, wherein said hollow shaft has a bolt holder mounted at a head portion thereof.

12. Apparatus as claimed in claim 10, wherein said driving means comprises a plurality of air motors and reduction means.

13. Apparatus as claimed in claim 10, further comprising means for preventing scattering of coolant flowing out of each of said CRD housings when said fixing means is detached, and drain means for discharging released coolant to a predetermined position.

14. Apparatus as claimed in claim 13, wherein said bolt wrench assemblies are located in an annular bolt house secured to an upper portion of an outer periphery of said housing means, and said coolant scattering preventing means comprises a drain sleeve mounted on an outer periphery of said bolt house for upward movement therealong, and driving means mounted on said housing means for moving said drain sleeve, said drain sleeve having a packing mounted at an upper end thereof and adapted to be brought into liquid-tight sealing engagement with outer peripheries of the CRD and CRD housing.

15. Apparatus as claimed in claim 13, wherein said bolt wrench assemblies are located in an annular bolt house secured to an upper portion of an outer periphery of said housing means, and said drain means commmprises a plurality of drain holes formed in said bolt house, and a plurality of drain tubes connected to said bolt house and each communicating with one of said drain holes.

16. Apparatus as claimed in claim 10, wherein said uncoupling means comprises a screw cylinder engageable with a lower portion of a piston tube fitted in each CRD, and means for driving said screw cylinder for reciprocatory movement.

17. Apparatus as claimed in claim 16, wherein said screw cylinder is fitted for reciprocatory movement in a cylinder tube rotatably supported in said housing means so that the screw cylinder is rotatable with the cylinder tube as a unit, resilient means is fitted in said cylinder tube so as to resiliently support said screw cylinder when the screw cylinder is in a lower position, said driving means for driving the screw cylinder for reciprocatory movement comprises means for supplying pressurized fluid to said cylinder tube.

18. Apparatus as claimed in claim 17, wherein said screw cylinder has a piston fitted therein for reciprocatory movement, said piston having connected thereto a piston rod extending upwardly therefrom, and a reed switch mounted at an upper end of said piston rod, said reed switch being adapted to be actuated by a magnet mounted on an index tube in the CRD and located at a predetermined height so that uncoupling of the control rod from the CRD can be detected by actuation of said reed switch by said magnet.

19. Apparatus as claimed in claim 18, wherein said piston and said reed switch are normally disposed in a withdrawn or inoperative position and adapted to move upwardly to an extended or operative position as said screw cylinder moves upwardly when the pressurized fluid is supplied to said cylinder tube by said pressurized fluid supply means.

20. Apparatus for handling control rod drives (hereinafter referred to as CRD's), each CRD being received in an elongated housing mounted to a reactor pressure vessel so as to extend vertically into and out of the reactor vessel and being provided with a piston tube, each CRD having an upper end portion connected with a lower end of a control rod and a lower end portion connected with a lower end of the elongated housing by detachable fixing means, and a plug-socket means for connecting the upper end portion of the CRD with the lower end of the control rod so that the CRD may be uncoupled from the control rod when the piston tube is longitudinally moved toward the lower end of the control rod, comprising in combination:
   a CRD attaching and detaching means including cylindrical housing means, uncoupling means disposed in said housing means for engaging a lower end portion of said piston tube and for longitudinally moving the piston tube toward the lower end of the control rod to uncouple said CRD from said control rod, and means mounted on said housing means for effecting attaching and detaching of the fixing means, said uncoupling means comprises a screw cylinder engageable with a lower end portion of the piston tube of said CRD's, and means for driving said screw cylinder for reciprocatory motion;

means for supporting said CRD attaching and detaching means; and means for moving said supporting means longitudinally of the CRD.

21. Apparatus as claimed in claim 20, wherein said uncoupling means further comprises means for detecting uncoupling of the control rod from the CRD.

22. Apparatus as claimed in claim 20, wherein said screw cylinder is fitted for reciprocatory movement in a cylinder tube rotatably supported in said housing means so that the screw cylinder is rotatable with the cylinder tube as a unit, resilient means is fitted in said cylinder tube so as to resiliently support said screw cylinder when the latter is in its lower position, said driving means for reciprocatory movement comprises means for supplying pressurized fluid to said cylinder tube.

23. Apparatus as claimed in claim 22, wherein said screw cylinder has a piston fitted therein for reciprocatory movement, said piston having connected thereto a piston rod extending upwardly therefrom, and a reed switch is mounted at an upper end of said piston rod, said reed switch being adapted to be actuated by a magnet mounted on an index tube in the CRD and located at a predetermined height, so that uncoupling of the control rod from the CRD can be detected by actuation of said reed switch by said magnet.

24. Apparatus as claimed in claim 23, wherein said piston and said reed switch are normally disposed in a withdrawn or inoperative position and adapted to move upwardly to an extended or operative position as said screw cylinder moves upwardly when the pressurized fluid is supplied to said cylinder tube by said pressurized fluid supply means.

25. Apparatus as claimed in claim 24, wherein said screw cylinder is formed at an upper end thereof with an internally threaded portion which is engageable with an externally threaded portion formed on an outer periphery of the lower end portion of said piston tube, and said uncoupling means further comprises means for driving said screw cylinder for rotation.

26. Apparatus as claimed in claim 25, wherein said driving means for rotation comprises an air motor and a reduction means.

27. Apparatus for handling control rod drives (hereinafter referred to as CRD's), each CRD being received in an elongated housing mounted to a reactor pressure vessel so as to extend vertically into and out of the reactor vessel and being provided with a piston tube, each CRD having an upper end portion connected with a lower end of a control rod and a lower end portion connected with a lower end of the elongated housing by detachable fixing means, and a plug-socket means for connecting the upper end portion of the CRD with the lower end of the control rod so that the CRD may be uncoupled from the control rod when the piston tube is longitudinally moved toward the lower end of the control rod, comprising in combination:

a CRD attaching and detaching means including cylindrical housing means, uncoupling means disposed in said housing means for engaging a lower end portion of said piston tube and for longitudinally moving the piston tube toward the lower end of the control rod to uncouple said CRD from said control rod, and means mounted on said housing means for effecting attaching and detaching of the fixing means;

means for supporting said CRD attaching and detaching means including two support arms; and means for moving said supporting means longitudinally of the CRD.

28. Apparatus for handling control rod drives (hereinafter referred to as CRD's), each CRD being received in an elongated housing mounted to a reactor pressure vessel so as to extend vertically into and out of the reactor vessel and being provided with a piston tube, each CRD having an upper end portion connected with a lower end of a control rod and a lower end portion connected with a lower end of the elongated housing by detachable fixing means, and a plug-socket means for connecting the upper end portion of the CRD with the lower end of the control rod so that the CRD may be uncoupled from the control rod when the piston tube is longitudinally moved toward the lower end of the control rod, comprising in combination:

a CRD attaching and detaching means including cylindrical housing means, uncoupling means disposed in said housing means for engaging a lower end portion of said piston tube and for longitudinally moving the piston tube toward the lower end of the control rod to uncouple said CRD from said control rod, and means mounted on said housing means for effecting attaching and detaching of the fixing means;

means for supporting said CRD attaching and detaching means; and means for moving said supporting means longitudinally of the CRD including a column, a carriage movably arranged on one side of said column, a winding drum, and means for rotating said winding drum arranged on the other side of said column, said winding drum having a rope wound thereon and fixed at one end to said carriage, said supporting means is mounted on said carriage.

29. Apparatus for handling control rod drives (hereinafter referred to as CRD's) attached by detachable fixing means to housing mounted in a reactor pressure vessel and each coupled to one of control rods inserted in the reactor pressure vessel, comprising in combination:

cylindrical housing means;

uncoupling means mounted in the housing means for uncoupling each of said control rods from one of said CRD's;

means mounted on the housing means for effecting attaching and detaching of said fixing means;

means for supporting said housing means;

means for moving the support means longitudinally of the CRD; and wherein each of said CRD's is fixed to one of said CRD housings by means of a plurality of bolts; and wherein said means for effecting attaching and detaching of said fixing means comprises bolt wrench assemblies equal in number to said bolts arranged in an outer peripheral portion of said CRD housing, said bolt wrench assemblies being located in an annular bolt house secured to an upper portion of an outer periphery of said housing means.

30. Apparatus as claimed in claim 29, wherein said coolant scattering preventing means comprises a drain sleeve mounted on an outer periphery of said bolt house for upward movement therealong, and driving means mounted on said housing means for moving said drain sleeve, said drain sleeve having a packing mounted at an upper end thereof and adapted to be brought into liquid-tight sealing engagement with outer peripheries of the CRD and CRD housing.

31. Apparatus as claimed in claim 29, wherein said drain means comprises a plurality of drain holes formed in said bolt house, and a plurality of drain tubes connected to said bolt house and each communicating with one of said drain holes.

32. Apparatus for handling control rod drives (hereinafter referred to as CRD's), each CRD being received in an elongated housing mounted to a reactor pressure vessel so as to extend vertically into and out of the reactor vessel and being provided with a piston tube, each CRD having an upper end portion connected with a lower end of a control rod and a lower end portion connected with a lower end of the elongated housing by detachable fixing means, and a plug-socket means for connecting the upper end portion of the CRD with the lower end of the control rod so that the CRD may be uncoupled from the control rod when the piston tube is longitudinally moved toward the lower end of the control rod, comprising in combination:

a CRD attaching and detaching means including cylindrical housing means, uncoupling means disposed in said housing means for engaging a lower end portion of said piston tube and for longitudinally moving the piston tube toward the lower end of the control rod to uncouple said CRD from said control rod, and means mounted on said housing means for effecting attaching and detaching of the fixing means;

means for supporting said CRD attaching and detaching means; and means for moving said supporting means longitudinally of the CRD including means for gripping a CRD to hold the CRD in an alignment with said CRD attaching and detaching means, said gripping means including a carriage movably mounted on a column, means for selectively locking the carriage in a desired position on one side of the column, and two pairs of arms pivotally mounted to said carriage so as to be movable toward and away from each other in each pair for gripping the CRD.

33. Apparatus for handling control rod drives (hereinafter referred to as CRD's), each CRD being received in an elongated housing mounted to a reactor pressure vessel so as to extend vertically into and out of the reactor vessel and being provided with a piston tube, each CRD having an upper end portion connected with a lower end of a control rod and a lower end portion connected with a lower end of the elongated housing by detachable fixing means, and a plug-socket means for connecting the upper end portion of the CRD with the lower end of the control rod so that the CRD may be uncoupled from the control rod when the piston tube is longitudinally moved toward the lower end of the control rod, comprising in combination:

a CRD attaching and detaching means including cylindrical housing means, uncoupling means disposed in said housing means for engaging a lower end portion of said piston tube and for longitudinally moving the piston tube toward the lower end of the control rod to uncouple said CRD from said control rod, and means mounted on said housing means for effecting attaching and detaching of the fixing means;

means for supporting said CRD attaching and detaching means; and means for moving said supporting means longitudinally of the CRD including a column, a first carriage movably arranged on one side of said column, a winding drum, means for rotating said winding drum arranged on the other side of said column, said winding drum having a rope wound thereon and fixed at one end to said first carriage, said supporting means being mounted on said first carriage, and means for gripping a CRD to hold the CRD in an alignment with said CRD attaching and detaching means, said gripping means including a second carriage movable on the other side of said column, means for selectively locking said second carriage at desired positions on the other side of the column, and two pairs of arms pivotally mounted to said second carriage so as to be movable toward and away from each other in each pair for gripping and releasing the CRD.

34. Apparatus as claimed in claim 33, further comprising means for carrying said column, said CRD attaching and detaching means, said moving means and gripping means being mounted on said carrying means, said carrying means including rotatable platform disposed in a reactor lower chamber defined in a pedestal means for supporting the reactor pressure vessel, a first carriage car disposed on said rotatable platform for linear movement, and a second carriage car disposed on said first carriage car for linear movement substantially transverse to the linear movement of said first carriage car, said column being pivotally mounted to said second carriage car.

35. Apparatus for handling control rod drives (hereinafter referred to as CRD's), each CRD being received in an elongated housing mounted to a reactor pressure vessel so as to extend vertically into and out of the reactor vessel and being provided with a piston tube, each CRD having an upper end portion connected with a lower end of a control rod and a lower end portion connected with a lower end of the elongated housing by detachable fixing means, and a plug-socket means for connecting the upper end portion of the CRD with the lower end of the control rod so that the CRD may be uncoupled from the control rod when the piston tube is longitudinally moved toward the lower end of the control rod, comprising in combination:

a CRD attaching and detaching means including cylindrical housing means, uncoupling means disposed in said housing means for engaging a lower end portion of said piston tube and for longitudinally moving the piston tube toward the lower end of the control rod to uncouple said CRD from said control rod, and means mounted on said housing means for effecting attaching and detaching of the fixing means, each of said CRD's is fixed to one of said CRD housings by means of a plurality of bolts, and said means for effecting attaching and detaching of said fixing means comprises bolt wrench assemblies equal in number to said bolts;

means for supporting said CRD attaching and detaching means; and means for moving said supporting means longitudinally of the CRD.

36. Apparatus as claimed in claim 35, wherein each of said bolt wrench assemblies comprises a bolt wrench engageable with one of said bolts, and means for driving each bolt wrench for rotation.

37. Apparatus as claimed in claim 36, wherein each bolt wrench is reciprocatorily fitted in a hollow shaft rotatably supported by said housing means, and resilient means is mounted in said hollow shaft for normally urging the bolt wrench to move upwardly by its biasing force and said shaft is driven for rotation by said driving means.

38. Apparatus as claimed in claim 37, wherein said hollow shaft has a bolt holder mounted at a head portion thereof.

39. Apparatus as claimed in claim 37, wherein said driving means comprises a plurality of air motors and reduction means.

* * * * *